United States Patent

Boyd et al.

[11] Patent Number: 6,127,976
[45] Date of Patent: Oct. 3, 2000

[54] DISTRIBUTED NETWORK FOR MULTI-LATERATION WITH CIRCULARLY POLARIZED ANTENNA FOR HEMISPHERICAL COVERAGE

[75] Inventors: Robert W. Boyd, Eidson, Tenn.; David J. Stryker, Palo Alto, Calif.; Ronald J. Hash, Rogersville, Tenn.; Donald K. Belcher, Rogersville, Tenn.; Michael A. Wohl, Rogersville, Tenn.; Timothy C. Harrington, Los Gatos, Calif.

[73] Assignee: Wherenet, Inc., Santa Clara, Calif.

[21] Appl. No.: 09/390,030

[22] Filed: Sep. 2, 1999

Related U.S. Application Data

[60] Provisional application No. 60/098,948, Sep. 3, 1998.

[51] Int. Cl.$^7$ ........................................................ G01S 3/02
[52] U.S. Cl. .............................................................. 342/463
[58] Field of Search .................................... 342/463, 464, 342/465, 450

[56] References Cited

U.S. PATENT DOCUMENTS

5,890,068  3/1999  Fattouche et al. ....................... 342/457
5,977,913  11/1999  Christ ........................................ 342/465

Primary Examiner—Theodore M. Blum
Attorney, Agent, or Firm—Charles E. Wands

[57] ABSTRACT

A distributed radio geo-location and tracking system has a distributed subsystem architecture that distributes its processing workload over a plurality of information handling and processing subsystems. For maximum detection capability, each of a plurality of tag emission receivers is equipped with a circularly polarized, omnidirectional antenna, to provide hemispherical coverage. The receivers are coupled to a partitioned plurality of detection processors, that are coupled via distributed association processors to multiple location processors. Each detection processor demodulates and time stamps received energy correlated to known spreading codes of the tags, to associate received energy with only one tag. It transmits a message containing this information over a communication framework to an association processor. The computational load is equitably distributed by a flow control mechanism among available association processors, with all receptions of a single tag transmission being directed to the same association processor. An association processor organizes received messages by tag and time-of-arrival (TOA), and transmits association reports over an association communication process of the communication framework to one of plural distributed location processors. A location processor determines the geographical locations of tags using the TOA information in the association reports.

20 Claims, 3 Drawing Sheets

DISTRIBUTED NETWORK FOR MULTI-LATERATION WITH CIRCULARLY POLARIZED ANTENNA FOR HEMISPHERICAL COVERAGE

CROSS-REFERENCE TO RELATED APPLICATION

The present application claims the benefit of co-pending U.S. Provisional Patent Application Serial No. 60/098,948, filed Sep. 3, 1998, by R. Boyd et al, entitled: "Distributed Network for Multi-Lateration Employing Circularly Polarized Antenna for Hemispherical Coverage," assigned to the assignee of the present application and the disclosure of which is incorporated herein.

FIELD OF THE INVENTION

The present invention relates in general to object location systems and tracking applications, such as asset management systems, where continuous identification of the locations of a variety of objects is desired. In particular, the invention is directed to a distributed radio geo-location and tracking system having a network of interconnected information handling and processing subsystems, that execute differential time-of-arrival (DTOA) processing of emissions from transmitter-tags of a plurality of objects and detected at multiple receiver sites. Such a geo-location tracking system may be of the type described in the U.S. Patent to D. Belcher et al, U.S. Pat. No. 5,920,287 (hereinafter referred to as the '287 patent), entitled: "Radio Location System for Precisely Tracking Objects by RF Transceiver Tags Which Randomly and Repetitively Emit Wideband Identification Signals," assigned to the assignee of the present application and the disclosure of which is incorporated herein.

BACKGROUND OF THE INVENTION

Although the technique of geo-locating an object based upon time-of-arrival (TOA) and differential time-of-arrival (DTOA) of radio transmissions (typically emanating from a transponder 'tag' attached to the object) is well known, attempting to implement such a system for use with a practical environment (e.g., industrial, transportation, and the like, where the number and geographical distribution density of objects can be extremely high and widespread), can become a relatively daunting task. In such an environment, execution of a multi-lateration algorithm for all tags cannot be carried out by a single processor, due to its lack of processing power.

Moreover, as pointed out in the above-referenced '287 patent, conventional object tracking systems are typically not concerned with the more fundamental problem of asset management, which not only addresses the need to locate and track components in the course of their travel through a manufacturing and assembly sequence, but is also concerned with the more general problem of component and equipment inventory control, where continuous knowledge of the whereabouts of any and all assets is desired and/or required. In such an environment, because each tag transmission can be expected to be detected by dozens or even hundreds of front end receiver units, it would not only be desirable, but practically essential, to provide some form of partitioning and distribution of the processing load.

SUMMARY OF THE INVENTION

The present invention successfully addresses this problem by means of a distributed data processing architecture, that is readily integrated with a geo-location tracking system of the type described in the above-referenced '287 patent, and is configured to distribute the object monitoring workload over a plurality of interconnected information handling and processing subsystems. Distributing the processing load enables fault tolerance through dynamic reallocation.

As will be described, the front end reader processing subsystem is partitioned into a plurality of detection processors, so that data processing operations associated with multiple readers are distributed among sets of detection processors. The partitioned detection processors are coupled in turn through distributed association processors to multiple location processors. For maximum tag detection capability, each receiver is preferably equipped with a low cost omnidirectional antenna, that provides hemispherical coverage within the monitored environment.

Each receiver supplies two outputs to its associated detection processor: 1—the time-of-arrival (TOA) of the earliest detectable edge of the detected tag blink, and 2—the actual data embedded in the received signal. In order to enable the entire network to operate synchronously, and conduct differential time-of-arrival (DTOA) measurements for computing the actual location of a transmitting tag, all receiver clocks are synchronized by a common time reference, such as by means of a bus or wireless time broadcast. Each detection processor serves multiple ones but less than all of the receivers of the system, so that tag emission detection processing is distributed among multiple detection processors. Because a respective detection processor is coupled to multiple receivers, it is capable of performing its functions on multiple, simultaneous tag blink receptions from multiple antenna-receiver modules distributed among different physical locations of the monitored environment.

A detection processor filters received energy to determine the earliest time-of-arrival energy received for a tag transmission, and thereby minimize multi-path effects on the eventually determined location of a tag. The detection processor demodulates and time stamps all received energy that is correlated to known spreading codes of the tags, so as to associate a received blink with only one tag. It then assembles this information into a message packet and transmits the packet as a tag detection report over a communication framework to one of the partitioned set of association processors, and then de-allocates the tag detection report.

The communication framework may comprise a standard digital communications infrastructure, and serves to deliver all detection reports for a single transmission from a single tag to a specific association processor. A detection processor to association control processor flow control mechanism equitably distributes the computational load among the available association processors, while assuring that all receptions of a single tag transmission, whether they come from one or multiple detection processors, are directed to the same association processor.

The flow control mechanism uses an information and processing load distribution algorithm, to determine which of the association processors is to receive the message, and queues the message on a prescribed protocol coupling socket connecting the detection processor to the destination association processor. To select a destination association processor, the information and processing load distribution algorithm may include a prime number-based hashing operation to ensure a very uniform distribution of packets among association processors. In addition, to provide relatively even partitioning in the case of widely varying transmission rates, the hashing algorithm may use a sequence number contained in each tag transmission.

Each association processor organizes its received message packets by tag identification (ID) and time-of-arrival (TOA), and stores them as association reports. The association processor compresses the data within the association report, transmits that information over an association communication process of the communication framework to one of a plurality of distributed location processors, and then de-allocates the association report.

In order to deliver all association reports that have been generated for an individual tag to a single destination location processor, the association communication process of the communication framework may employ the same information and processing load distribution algorithm executed by the detection communication process of the communication framework. Each location processor determines the geographical location of a tag using the time-of-arrival measurement information originally sourced from the detection processors. The specific algorithm employed for location determination matches the number of arrival time measurements with whatever a priori information is available.

To locate a tag, a location processor may employ all available diversity information associated with the tag of interest, including, but not limited to the tag ID, any data contained in the tag transmission and metrics indicating confidence it these values. It then forwards a location report containing this information over a location communication process to an asset management data base. A tag location estimate may be derived from the measured time-of-arrival information in a received association report packet, using a differential time-of-arrival algorithm, such as a hyperbolic geometry-based function.

In addition to tag location, the location processor may generate a confidence metric from evaluating geometric parameters. It may also employ diversity combination techniques to validate the tag identification, any data contained in the tag's transmission and any measured tag health information. All results produced by the location processor are formed into a location report that is sent over the location communication process of the framework for delivery to the data storage processor. After being transmitted the location report may be de-allocated. The location communications process of the communications framework may employ the same information and processing load distribution algorithm executed by the detection communication process.

DETAILED DESCRIPTION

Before describing in detail the new and improved distributed radio geo-location system in accordance with the present invention, it should be observed that the invention resides primarily in a prescribed arrangement of conventional communication circuits, associated digital signal processing components and attendant supervisory control circuitry, that controls the operation of such circuits and components. As a result, the configuration of such circuits components, and the manner in which they interface with other communication system equipment have, for the most part, been illustrated in the drawings by readily understandable block diagrams, which show only those details that are pertinent to the present invention, so as not to obscure the disclosure with details which will be readily apparent to those skilled in the art having the benefit of the description herein. Thus, the block diagram illustrations are primarily intended to show the major components of the system in a convenient functional grouping, whereby the present invention may be more readily understood.

Figure 1:
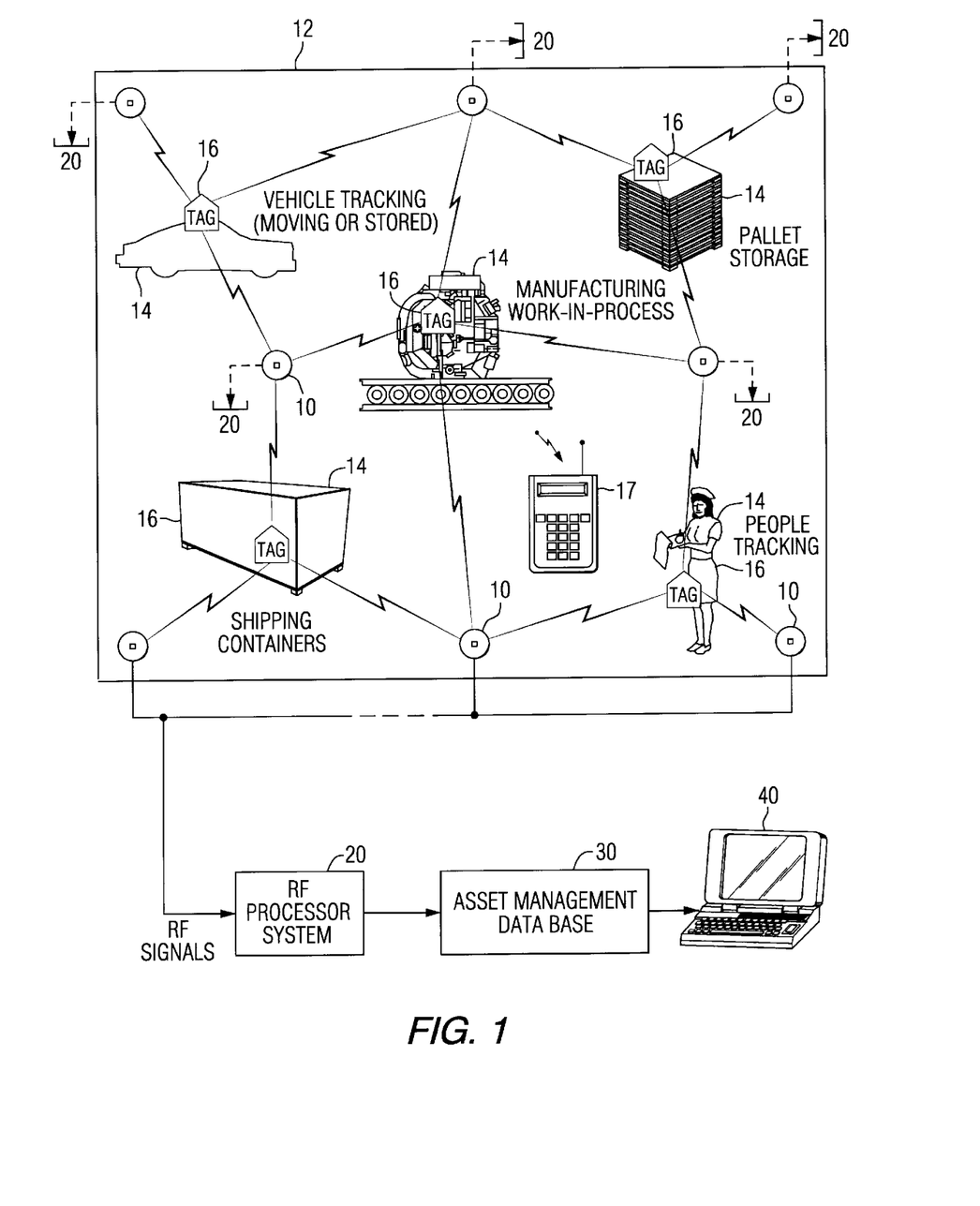
FIG. 1 diagrammatically illustrates the general architecture of the tagged object location system described in the above-referenced '287 patent.

Attention is initially directed to FIG. 1, which diagrammatically illustrates the general architecture of the tagged object location system described in the above-referenced '287 patent, as a non-limiting example of the type of radio geo-location system with which the present invention may be incorporated, to distribute the tag detection, identification and location processing workload over a plurality of interconnected information handling and processing subsystems. As shown therein a plurality of tag emission readers or receivers 10 are geographically distributed at a plurality of receiver sites within and/or around a prescribed asset management environment 12. The environment 12 contains a plurality of objects/assets 14, whose locations are to be monitored on a continuous basis and reported via an RF processing system 20 to an asset management data base 30. The data base 30 may be accessible by way of a standard computer workstation or personal computer, shown at 40.

Each receiver 10 is operative to monitor the asset management environment for emissions from one or more tags 16 each of which is affixed to an object to be tracked. A respective tag 16 transmits or 'blinks' a very short duration, wideband (spread spectrum) pulse of RF energy encoded with information, such as that representative of the identification of the object, and other object-associated information stored in memory within the tag. Each tag 16 repeatedly transmits or 'blinks' a spread spectrum encoded RF signal burst in a random manner.

The tag emission readers 10 may be installed at relatively unobtrusive locations within and/or around the perimeter of the monitored environment, such as doorway jams, ceiling support structures, etc. The reader/receivers 10 are coupled in groups to associated detection processors within the RF processing system 20 (to be described with reference to the data processing distribution architecture of FIG. 2). Each detection processor is operative to correlate the (spread spectrum) signals received from a tag with a set of spread spectrum reference signal patterns, and thereby determine which spread spectrum signals received by a reader 10 is a first-to-arrive spread spectrum signal burst transmitted from the tag 16.

The first-to-arrive signals extracted by a detection processor from inputs supplied from a plurality of its associated receivers 10 are forwarded to an object location processor within the processing system 20. The location processing system carries out time-of-arrival differentiation processing of these detected first-to-arrive transmissions, and thereby locates the geographical position of a tagged object within the monitored environment 12 to within a prescribed spatial resolution (e.g., on the order of ten feet). As pointed out above, where the monitored environment is one in which the number and geographical distribution density of objects is extremely high and widespread, not only can execution of a multi-lateration algorithm for all tags not be carried out by a single processor, but each tag transmission can be expected to be detected by a very large number of tag readers. This can result in a very substantial processing load on the processing system 20.

Figure 2:
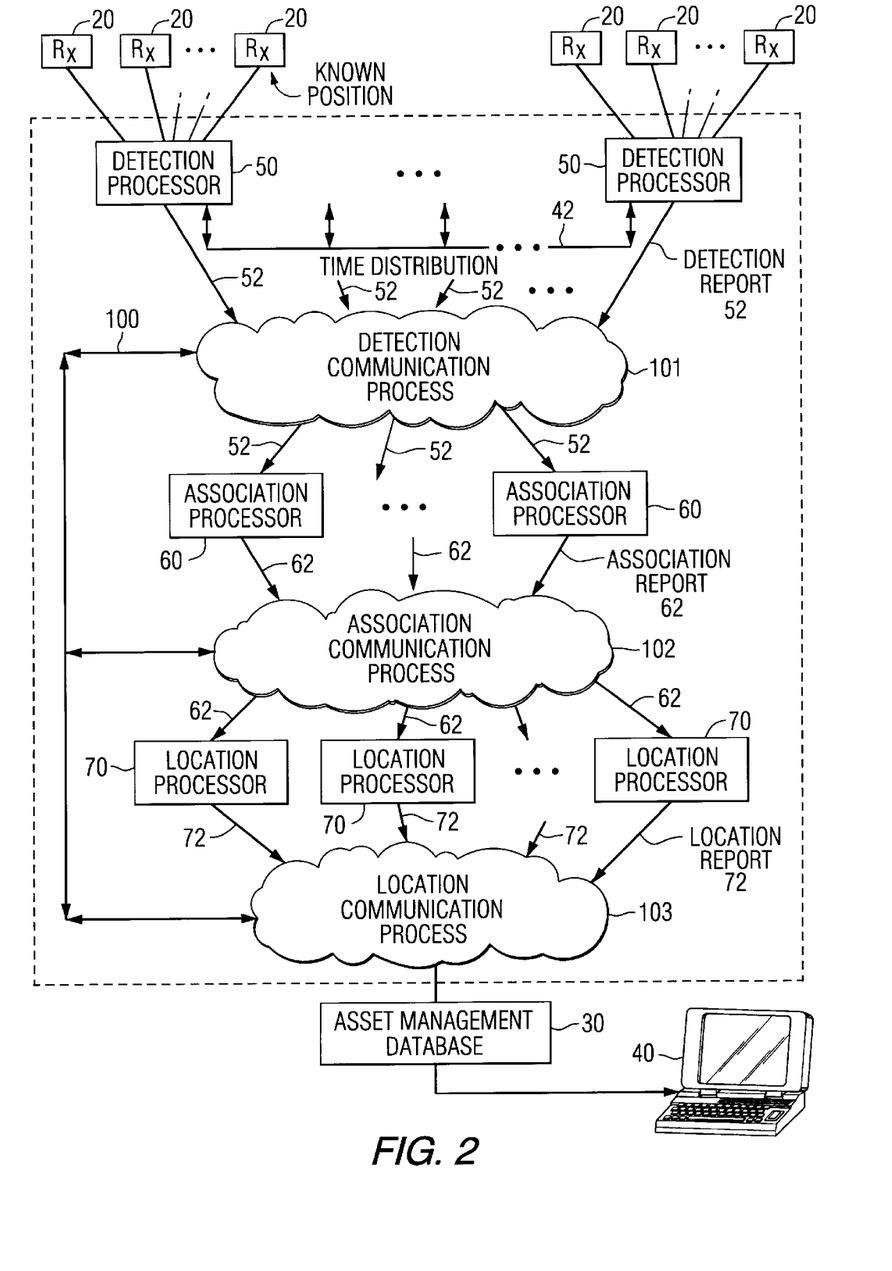
FIG. 2 diagrammatically illustrates a system architecture of a distributed radio geo-location system in accordance with the present invention.

Pursuant to the invention, a system architecture for which is diagrammatically illustrated in FIG. 2, this potential problem is remedied by partitioning the processing system 20 of FIG. 1 into a plurality of detection processors 50, and distributing the data processing operations associated with multiple readers 10 among the detection processors 50 and downstream association processors 60 and location processors 70.

Figure 3:
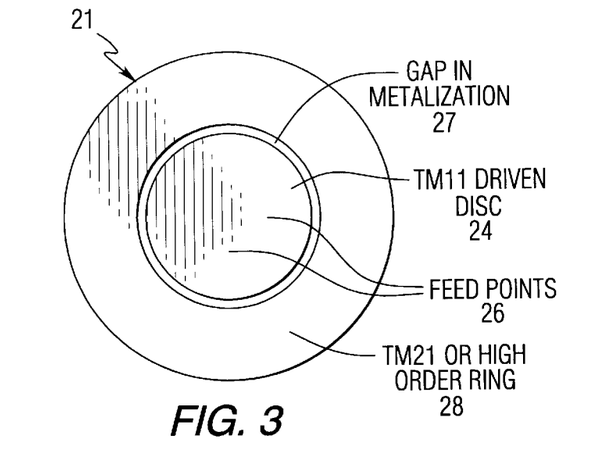
FIG. 3 is a diagrammatic front view of a receiver site antenna employed in the system of FIG. 2.
Figure 4:
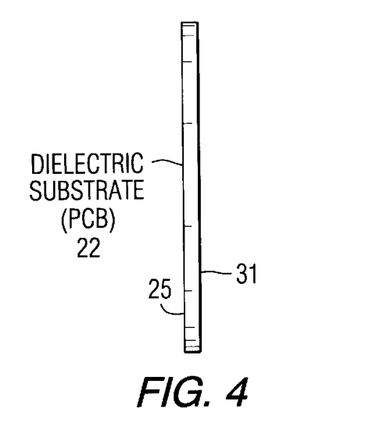
FIG. 4 is a diagrammatic side view of FIG. 3.
Figure 5:
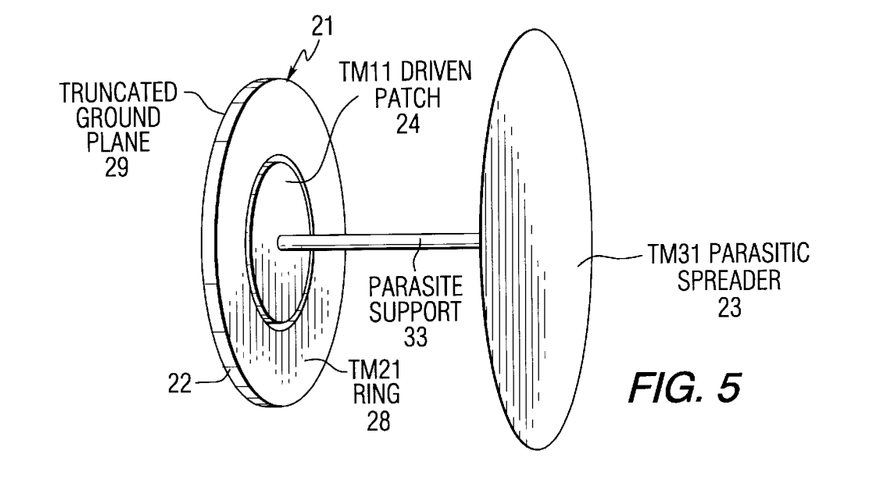
FIG. 5 is a diagrammatic perspective view of the receiver site antenna of FIG. 3 having a parasitic disc.

In addition, for maximum tag detection capability, each receiver 10 is equipped with an omnidirectional, circularly polarized antenna, that is preferably configured in the manner shown in FIGS. 3–5 so as to enables the receiver to receive signals from any direction. The antenna configuration employed in the present invention provides hemispherical coverage within the monitored environment, so as to maximize its response to the horizon and diminish the response by several dB to the signals arriving from the vertical (downward) direction.

The use of such an antenna provides the invention with features not offered by other configurations. If the antenna were a conventional linear element, such as a whip or monopole, certain orientations of the tag could create nulls in the coupling from the tag to the receiver. These would create serious degradations to location processing. The circularly polarized antenna employed in accordance with the invention has been designed to be which mitigates most of these effects. Also, a circularly polarized antenna can receive a signal with any orientation of the electric field vector.

In addition, by recognizing that the received signal strength at a receive antenna is generally much stronger if the signal is incident from a lower downward angle, the antenna can be optimized for this situation. For example, if the receive antennas are ceiling-mounted above a large factory environment, the tags that are 'very close' to the receiver sites are more likely to be "underneath" the antennas—thus, the angle of arrival of the tag transmission tends to be more 'vertical'.

On the other hand, tags that are very far away from the receiver site tend to have their signals that arrive at the antennas in a more generally horizontal direction. These antenna attributes have substantially improved the overall accuracy of our tracking and locating performance, since it enhances the ability to receive the earliest time-of-arrival of any signal.

As diagrammatically illustrated in the respective front and side views of FIGS. 3 and 4, the circularly polarized, omnidirectional receiver antenna has a generally disc-shaped or circularly planar configuration 21 formed on a generally circular dielectric substrate 22. This offers the advantage of being readily fabricated using printed wiring board techniques and materials. The resulting antenna radiation pattern is nearly equal at boresight and the horizon with only a slight reduction in gain in a conical region about boresight. The diagrammatic perspective view of FIG. 5 shows a parasitic spreader element 23 added to the disc-shaped structure 22 of FIGS. 3 and 4 to enhance its performance at the horizon. The configuration of the generally planar antenna structure of FIGS. 3–5 is preferred from an overall performance standpoint, at the cost of adding depth to an otherwise planar structure. It offers the advantage of a higher boresight gain than a stand alone TM11 patch, while broadening the beamwidth of the antenna.

The basic antenna configuration 21 contains a central circular conductive patch 24 (e.g., a metallic layer such as copper and the like), formed on a first side 25 of dielectric layer 22, and which may be driven at feed points 26 (in quadrature in the case of a TM11 patch antenna). Surrounding and spaced apart from the central patch 24 by an annular gap 27 is a conductive ring 28 that is coplanar with the central patch 24, and has an outer diameter which makes it resonate in the TM21 or TM31 mode. The central patch 24 may be sized to resonate in the TM11 mode when loaded by the conductive ring 28. A metallic ground plane 29 for the antenna is formed on a second surface 31 of the dielectric disc 22. The antenna's radiation pattern roll-off at the horizon may be on the order of 10 dB., depending on the ring employed.

The parasitic metallic disc 23 may have the same diameter as that of the annular ring 28, and may be supported by a metallic or dielectric rod or post 33, that is coaxial with disc shaped substrate 22, as there is no field present at that location, so as to enhance the axial ratio of the antenna at the horizon. Parasitic disc 23 may be sized to resonate in the TM21 or TM31 mode and may be axially spaced apart from the driven and ring elements 24 and 28, respectively, by a distance of approximately the TM31 resonate diameter. The optimum separation distance, which depends on the materials used and the dielectric of the spacing medium, is readily determined empirically by peaking the antenna gain at the horizon.

As described briefly above, and as detailed in the '287 patent, a respective receiver 10 is operative to demodulate spread-spectrum RF burst signals or 'blinks' from tagged objects emitting within its sensitivity range. As described therein, the emission or 'blink' from a tagged object may comprise a differential-phase-shift-keyed spread-spectrum modulation at a relatively high RF carrier frequency, such as in the 2.44 GHz range, as a non-limiting example. The RF signal is very low level, in the microvolt range. Upon being detected it is amplified, down-converted and finally demodulated to reproduce the data and determine its time-of-arrival, or TOA.

Each receiver 10 provides two outputs. The first is the time-of-arrival (TOA) of the earliest detectable edge of the detected radio signal. The second output is the actual "data" itself, that is, the series of 1's and 0's that comprise the data embedded in the received signal. In order to enable the entire network to operate synchronously, and compare the TOA at each receiver location, each receiver 10 has its own internal clock that is synchronized to all other receivers, This may be accomplished, for example, by broadcasting a wireless time reference or by connecting each receiver to a common time reference bus 42. Also, as described in the '287 patent, since the actual 'blink' time of a received spread-spectrum signal is not known, a determination is made of the relative time-of-arrival of a given emission at each receiver—termed differential time-of-arrival (DTOA)—in order to compute the actual location of the transmitting tag.

To distribute a time reference on the bus 42, a high speed pseudo random bit stream may be generated by an oscillator driving a pseudo random code generator, the output of which is coupled over the bus 42 to each receiver 10. The receivers 10 may be coupled in a "daisy chain" fashion, to that the timing signal bit stream may be sequentially passed form one receiver to the next along the bus 42. The receivers derive precise timing pulses from the high speed random bit stream transported over the bus, so that all receivers are "locked" to a common time base.

Each receiver/reader 10 is coupled to an associated detection processor 50, which serves multiple ones but less than all of the receivers of the system, so that tag emission detection processing is distributed among multiple detection processors. Because a respective detection processor 50 is coupled to multiple receivers, it is capable of performing its functions on multiple, simultaneous tag blink receptions from multiple antenna-receiver modules distributed among different physical locations (receiver sites 10) of the monitored environment 12.

Each detection processor 50 filters received energy through both spatial and time diverse filters, to determine the earliest time-of-arrival (TOA) energy received for that unique tag transmission. In this manner, multi-path effects on the eventually determined location of a tag emission are minimized. The detection processor demodulates and time stamps all received energy that is correlated to known spreading codes of the tags, and thereby associates a received RF signal burst with one and only one tag.

As described in the above-referenced '287 patent a matched filter correlator containing a plurality of matched filter parallel correlators operative to correlate received signals with successively time offset versions of a reference pseudo random spreading code corresponding to that of spread spectrum signals transmitted by a tag may be employed. The detection processor assembles this information into a compact data packet (or simply detect packet), and transmits the packet as a tag detection report 52 (by means of a distributed detection communication process portion 101 of a communication framework 100, to be described) to an arrangement of association processors 60. Namely, a unique detect packet is transmitted by the detection processor for each received and demodulated tag burst.

The communication framework 100 over which the detection communications process 101, as well as an association communication process 102 and location communication process 103, is performed, may comprise a standard digital communications infrastructure, and serves to deliver all detection reports for a single transmission from a single tag to a specific association processor 60. As will be described, the flow control algorithm employed by the detection communication process 101 functions to equitably distribute the computational load among the available association processors while assuring that all receptions of a single tag transmission, whether they come from one or multiple detection processors 50, are directed to the same association processor 60.

As a non-limiting example, the digital communications infrastructure may transfer data, formatted into packets, through TCP/IP stream sockets over an industry-standard Ethernet communications network. Each detection processor 50 opens a TCP/IP stream to every association processor 60. As pointed out above, when a receiver 10 coupled to that detection processor 50 detects a transmission from a tag, the detection processor 50 assembles the tag identity, the transmission time-of-arrival, and other information for that detection as a TCP/IP message packet, and hands that message off to the detection communications process 101. The detection communications process 101 uses an information and processing load distribution algorithm, described below, to determine which of the association processors is to receive the message, and queues the message on the TCP/IP socket connecting the detection processor 50 to the destination association processor 60.

The information and processing load distribution algorithm executed by the detection communications process 101 operates as follows. As pointed out above, and as described in the above-referenced '287 Patent, each tagged object to be located or tracked is uniquely distinguishable from all other tagged objects by its own dedicated digital code stored in the tag memory and which is encoded in each burst transmission from the tag. In effect, this tag identification (ID) code is akin to a "license plate number", which is transmitted as a long digital integer at each transmission from the tag.

Figure 6:
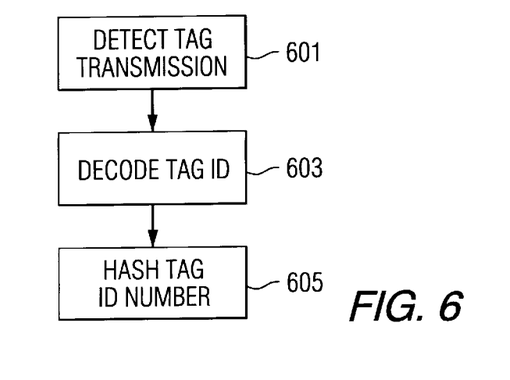
FIG. 6 is a flow chart associated with a information and processing load distribution algorithm that may be executed by respective portions of the communications process framework of the system architecture of FIG. 2.

As shown in the flow chart of FIG. 6, when a respective receiver 10 detects a transmitted RF burst from a tag, and its associated detection processor 50 processes the content of the received signal to detect a transmission from a tag in step 601, the detection processor decodes the tag identification number (or "license plate") in step 603 and performs a hashing algorithm on that number in step 605. The purpose of the hashing algorithm is to generate a number between one and the total number of association processors 60.

As described above, the detection processor 50 assembles the detected tag information into a detect packet and, using a packet transport protocol, such as TCP/IP, sends the packet over a physical transport medium, such as Ethernet, to an association processor identified by the hashing algorithm. In the hashing algorithm step 505 the digital code that identifies the tag of interest is multiplied by a relatively small prime number, with the product being divided by a relatively large prime number and computing the remainder. The remainder is divided by the number of association processors. Adding 'one' to the remainder of this division provides the number of the association processor 60 to which the detect packet will be transported by the detection communications process 101.

Although the use of prime numbers provides for a very uniform distribution of packets among association processors, it should be observed that other hashing algorithms may be employed. It may also be noted that where the tag transmission rate is highly variable, partitioning by tag ID ("license plate") number by itself will not distribute the processing and data transport load evenly. To provide relatively even partitioning in the case of widely varying transmission rates, each tag transmission, in addition to its ID, may contain a sequence number associated with the number of repeat transmissions. Namely, the sequence number is '1' for the first transmission from the tag, '2' for the next, and so forth for each subsequent transmission.

After performing tag detect processing, a detection processor 50 combines the sequence number and the tag identification number to produce a 'tag transmission ID' using any algorithm that produces that transmission ID reflecting both the tag identification and the tag transmission sequence number. Non-limiting examples of algorithms to produce the 'tag transmission ID' include concatenating the binary representations of the tag identification and the tag transmission sequence number, exclusive-ORing the binary representations of the tag identification and the tag transmission sequence number, and using a conventional shift-and-exclusive OR operator to combine the binary representations of the tag identification and the tag transmission sequence number.

This tag transmission ID is a single number of the same length as the tag identification number. The hashing algorithm then proceeds as described above, with the tag transmission ID substituted for the tag identification number. The result of the hashing algorithm is the same for all detection processors 50, since it depends exclusively on the contents of the tag transmission. In addition, the choice of the destination association processor will be uniformly distributed irrespective of the transmission rates among the tags.

Each association processor 60 organizes the detect packets it receives from one or more detection processors 50 by tag ID and time-of-arrival (TOA), and stores them as association reports (AR) 62 into separate caches of memory. Each AR 62 is conveyed over the association communication process 102 of the communication framework 100 to a location processor 70. (Depending upon application requirements and processing system infrastructure capacity, association processors 60 and location processors 70 may be performed on the same platform.) A detect packet received by the association processor 60 will be inserted into an already existing AR 62 only if it has the same tag ID as that AR. In addition, in order to be associated with an AR, the detect packet's TOA, when compared with the earliest and latest detect packets within the AR, must represent energy received from the same tag transmission.

If there is no current AR that shares the same ID as the newly received detect packet from a detection processor, a new AR will be allocated and the received detect packet placed into it. After a prescribed window of time has elapsed from the creation time of each AR, the association processor 60 compresses the data within the association report, transmits that information (AR 62) to a destination location processor 70, and de-allocates the AR. The lifetime of an AR window for accepting detect packets is large enough to compensate for existing latency in the detection communication process 101 of the communication framework 100 between the detection processor 50 and the association processor 60. The compression of data by the association processor 60 is preferably greater than 10:1, so as to minimize the impact on distributing the location processors 70 within the same network as the upstream detection processors.

The association communications process 102 delivers all association reports (ARs 62) that have been generated for an individual tag to a single destination location processor 70. For this purpose, the association communication process 102 may employ the same information and processing load distribution algorithm executed by the detection communication process 101, described above, where the detection processor 50 in the detection communication process 101 is replaced by the association processor 60 in the association communication process 102, and the association processor 60 in the detection communication process 101 is replaced by the location processor 70 in the association communication process 102.

Each location processor 70, which may comprise independent system resources (i.e. computers) or shared resources, is programmed to determine the geographical location of a tag using the time-of-arrival (TOA) measurement information originally sourced from the detection processor(s) 50. The specific algorithm employed for location determination matches the number of arrival time measurements with whatever a priori information is available. In order to determine the location of a respective tag, a location processor preferably exploits all available diversity information associated with the tag of interest, including, but not limited to the tag ID, any data contained in the tag transmission and metrics indicating confidence it these values. It ultimately forwards a location report 72 containing this information over a location communication process 103 to an asset management data base or data storage processor 30.

In accordance with a non-limiting but preferred embodiment, each location processor 70 generates a tag location estimate from the measured TOA information in a received AR packet. If the exact time of the transmission by the tag is known, a range based algorithm may be used. However, from a practical standpoint, tag transmission time is generally unknown, so that a differential range (or differential TOA) algorithm, such as described in the above-referenced '287 patent is utilized. In the absence of any distinctive information regarding tag location (e.g. it resides in a hallway) a completely determined two-dimensional solution may be realized from three TOA measurements using a conventional geo-location function, such as but not limited to a hyperbolic geometry-based algorithm. In many instances, the third dimension (e.g., the tag is located slightly above ground level) can be inferred from the two-dimensional solution. If this is not the case, then four TOA measurements are required for a solution. In the completely determined situation, any algorithm suitable for GPS applications may be utilized.

If more than three or four TOA measurements are available, or more than one tag transmission originated from the same location, the location solution is likely over-determined. In this case, tag location may be identified by an interactive process that combines individual hyperbolic solutions weighed by confidence metrics. In its extreme form, this algorithm becomes the well known maximum a posteriori probability (MAP) estimator. In addition, in order to discard misleading TOA measurements and limit computational complexity, a preprocessor may be used upstream of the multi-lateration algorithm.

In a practical environment, such as an industrial or transportation application, it can be expected that a direct RF path from a tag to an antenna may occasionally be blocked, so that the possibility of detecting reflected energy exists, which produces a late TOA. This condition is readily detectable by comparing TOA's prior to calculating tag location. Moreover, the complexity of the location processing can be limited by considering only those TOA measurements obtained from geographically advantaged positions.

In addition to tag location, the location processor 70 may be programmed to generate a confidence metric from evaluating geometric parameters (e.g. GDOP) and TOA measurement accuracies (e.g. standard deviations). It may also employ diversity combination techniques to validate the tag ID, any data contained in the tag's transmission and any measured tag health information. As pointed out above, all results produced by the location processor 70 are formed into a location report 72 that is sent over the location communication process portion 103 of the framework 100 for delivery to the user.

The location communications process portion 103 of the communication framework 100 delivers all location reports 72 for all tags to the data storage processor 30. As with the case of the association communication process 102 referenced above, the location communications process may employ the same information and processing load distribution algorithm executed by the detection communication process 101, where the detection processor 50 in the detection communication process 101 is replaced by the association processor 70 in the location communication process 103, and the association processor 60 in the detection communication process 101 is replaced by the data storage processor 30 in the location communication process 103. The data storage processor 30 receives location reports 72 sent by the location communications process 103, examines them to determine if the locations contained in the reports are outside prescribed bounds (which may trigger an alert), and stores the locations reports 72 for analysis and display via a user workstation 40.

As will be appreciated from the foregoing description, the desire to efficiently process tag location information derivable from a radio geo-location system employed for a widely dispersed population of receiver sites, such as may be employed at an industrial facility, transportation depot, warehouse, and the like, is successfully achieved by the distributed geo-location system architecture of the present invention. By distributing the location processing workload over a plurality of interconnected information handling and processing subsystems, differential time-of-arrival (DTOA) information available from multiple receiver sites may be expeditiously processed, to accurately locate each transmitting tag, irrespective of the number of tags and the number of sites from which transmissions from the tags are monitored.

While we have shown and described a preferred embodiment of the present invention, it is to be understood that the same is not limited thereto but is susceptible to numerous changes and modifications as are known to a person skilled in the art. As a consequence, we do not wish to be limited to the details shown and described herein, but intend to cover all changes and modifications as are obvious to one of ordinary skill in the art.

What is claimed is:

1. A method for identifying the geographical locations of objects having tags containing transmitters, a respective tag's transmitter being operative to transmit signals containing information identifying its associated tag, said method comprising the steps of:

(a) receiving, at a plurality of geographically dispersed receivers having known geographical positions, signals transmitted from one or more of said tags;

(b) processing signals received in step (b) at each of a plurality of detection processors to which receivers receiving signals from a tag in step (a) are coupled, so as to determine the earliest time-of-arrival of signals received thereby from said tag;

(c) assembling, at said each of said detection processors, a respective message containing the identification of said tag and the earliest time-of-arrival of signals received therefrom by a receiver to which said each detection processor is coupled;

(d) transmitting messages assembled in step (c) by said detection processors for multiple tags to a plurality of association processors, and such that messages assembled in step (c) by said detection processors for the same tag are transmitted to the same association processor, each association processor being operative to store contents of messages received from one or more detection processors as a respective association report for a respective tag; and (e) transmitting association reports stored by said association processors in step (d) to a plurality of location processors, each of which is operative to determine the geographical location of tags identified in association reports received thereby, in accordance with time-of-arrival information for said tags contained in said association reports.

2. A method according to claim 1, further including the step of:

(f) coupling information contained in location reports identifying the geographical locations of tags determined in step (e) with a user interface.

3. A method according to claim 1, wherein step (d) comprises transmitting messages assembled by said detection processors in step (c) for different tags to different ones of said plurality of association processors, so as to distribute messages for different tags among plural association processors.

4. A method according to claim 3, wherein step (d) comprises distributing messages assembled by said detection processors in step (c) for different tags in a generally uniform manner among different association processors.

5. A method according to claim 1, wherein step (e) comprises transmitting association reports for different tags to different ones of said plurality of location processors, so as to distribute association reports for different tags among plural location processors.

6. A method according to claim 5, wherein step (e) comprises distributing association reports in a generally uniform manner among different location processors.

7. A method according to claim 1, wherein a respective tag transmitter is operative to randomly and repetitively transmit a spread spectrum signal encoded with information representative of the identification of its associated object, and wherein step (b) comprises correlating spread spectrum signals received in step (a) with spread spectrum reference signal patterns, and thereby determining which received spread spectrum signals are first-to-arrive spread spectrum signals as transmitted from a tag.

8. A method according to claim 7, wherein step (b) further comprises processing signals received in step (a) by means of a matched filter correlator, having a plurality of matched filter parallel correlators which are operative to correlate received signals with successively time offset versions of a reference pseudo random spreading code corresponding to that of spread spectrum signals transmitted by said tag.

9. A system for identifying the geographical locations of objects having tags containing transmitters, a respective tag's transmitter being operative to transmit signals containing information identifying its associated tag, comprising:

a plurality of geographically dispersed receivers having known geographical positions, and being operative to receive signals transmitted from one or more of said tags;

a plurality of detection processors coupled to said receivers, and being operative to process signals received thereby to identify earliest time-of-arrival signals received from a tag, a respective detection processor being operative to transmit a respective message, containing the identification of a tag and the earliest time-of-arrival of signals received therefrom by a receiver to which said each detection processor is coupled, over a communication framework to a selected one of a plurality of association processors, such that messages transmitted by detection processors for the same tag are transmitted to the same association processor;

each association processor being operative to store contents of messages received from one or more detection processors as a respective association report for a respective tag, and to transmit association reports over said communication framework to a plurality of location processors; and wherein each location processor is operative to determine the geographical location of tags identified in association reports received thereby, in accordance with time-of-arrival information for said tags contained in said association reports.

10. A system according to claim 9, further a digital storage facility which is operative to couple with a user interface information contained in location reports identifying geographical locations of tags.

11. A system according to claim 9, wherein said communication framework is configured to distribute messages transmitted by said detection processors for different tags to different ones of said plurality of association processors.

12. A system according to claim 11, wherein said communication framework is configured to distribute messages transmitted by said detection processors for different tags in a generally uniform manner among different association processors.

13. A system according to claim 9, wherein said communication framework is configured to distribute association reports for different tags to different ones of said plurality of location processors.

14. A system according to claim 13, wherein said communication framework is configured to distribute association reports in a generally uniform manner among different location processors.

15. A system according to claim 9, wherein a respective tag transmitter is operative to randomly and repetitively transmit a spread spectrum signal encoded with information representative of the identification of its associated object, and wherein a detection processor is operative to correlate received spectrum signals with spread spectrum reference signal patterns, and thereby determine which received spread spectrum signals are first-to-arrive spread spectrum signals as transmitted from a tag.

16. A system according to claim 9, wherein a respective receiver includes a circularly polarized, omni-directional antenna providing generally hemispherical coverage of said objects.

17. A distributed data processing system for use with a geo-location system for identifying geographical locations of objects having tags containing transmitters, a respective tag's transmitter being operative to transmit signals containing information identifying its associated tag, and including a plurality of geographically dispersed receivers having known geographical positions, and being operative to receive signals transmitted from one or more of said tags, said system comprising a plurality of detection processors, partitioned among said plurality of geographically dispersed receivers, and being coupled to derive, from signals received by a receiver coupled thereto, times-of-arrival of earliest detectable portions of tag transmissions and tag identification information data contained therein, and wherein a respective detection processor is operative to transmit, over a communication framework to one of a partitioned set of association processors, a tag detection report containing the time-of-arrival of and tag identification information within a received transmission for a single tag;

a respective association processor being operative to store received messages from one or more detection processors and to transmit association reports for respective tags over said communication framework to one of a partitioned set of location processors, such that an association report for a given tag is transmitted to one location processor; and wherein a respective location processor is operative to determine the geographical location of a tag using time-of-arrival information derived from information in association reports derived from messages from said detection processors associated with said tag.

18. A distributed data processing system according to claim 17, wherein said communication framework is operative to determine which of said association processors is to receive messages from detection processors associated with a given tag in accordance with an operation that distributes messages among association processors based upon contents of tag transmissions.

19. A distributed data processing system according to claim 18, wherein said communication framework is operative to determine which of said location processors is to receive an association report from an association processor in accordance with an operation that distributes messages among location processors based upon contents of tag transmissions.

20. A distributed data processing system according to claim 18, wherein a respective receiver includes a circularly polarized, omnidirectional antenna providing generally hemispherical coverage of said objects.

* * * * *